United States Patent
Grossart

(10) Patent No.: US 7,997,158 B2
(45) Date of Patent: Aug. 16, 2011

(54) ROTARY TO LINEAR TRANSMISSION

(75) Inventor: Stuart James Cameron Grossart, Brighton East Sussex (GB)

(73) Assignee: Thales Holdings UK PLC (GB)

( * ) Notice: Subject to any disclaimer, the term of this patent is extended or adjusted under 35 U.S.C. 154(b) by 273 days.

(21) Appl. No.: 12/278,550

(22) PCT Filed: Feb. 9, 2007

(86) PCT No.: PCT/EP2007/051289
§ 371 (c)(1),
(2), (4) Date: Oct. 23, 2008

(87) PCT Pub. No.: WO2007/093564
PCT Pub. Date: Aug. 23, 2007

(65) Prior Publication Data
US 2010/0024579 A1    Feb. 4, 2010

(30) Foreign Application Priority Data

Feb. 15, 2006    (GB) .................................. 0603055.5

(51) Int. Cl.
*F16H 27/02*    (2006.01)
*F16H 29/02*    (2006.01)
*F16H 29/20*    (2006.01)

(52) U.S. Cl. ........................................ 74/89.2; 74/89.22

(58) Field of Classification Search .................. 74/89.2, 74/89.22, 490.04; 254/213, 266; 244/232, 244/233
See application file for complete search history.

(56) References Cited

U.S. PATENT DOCUMENTS

| 222,406 A | 12/1879 | Johnson |
| 1,928,532 A * | 9/1933 | Gillespie ...................... 74/89.22 |
| 2,859,629 A | 11/1958 | Parker |
| 3,273,408 A | 9/1966 | Nagel |
| 4,526,050 A | 7/1985 | Johnson |
| 4,804,285 A * | 2/1989 | Bradford ....................... 400/320 |

FOREIGN PATENT DOCUMENTS

EP    0161431 A    11/1985

* cited by examiner

*Primary Examiner* — Justin Krause
(74) *Attorney, Agent, or Firm* — Stroock & Stroock & Lavan LLP

(57) ABSTRACT

A mechanical linkage, for use on original equipment or for replacement of existing hydraulic ram based actuators, comprises a rotary to linear transmission. The transmission provides two co-rotatable capstans of different diameters, and two idler wheels spaced on a longitudinally slidable linkage. The capstans are linked to a first of the idler wheels by means of a pulley line wound from the first capstan, around the wheel, and then back to the second capstan. The first capstan is also linked by means of a pulley line to the second idler wheel, and the second capstan likewise to the second idler wheel by a third pulley line. The difference in diameters causes a differential winding of the various lengths of pulley line between the idler wheels and the capstans, which urges the linkage to slide relative to the capstans. Cooperation of the two capstan/idler wheel combinations compensates for possible backlash.

13 Claims, 1 Drawing Sheet

ROTARY TO LINEAR TRANSMISSION

Figure 1:
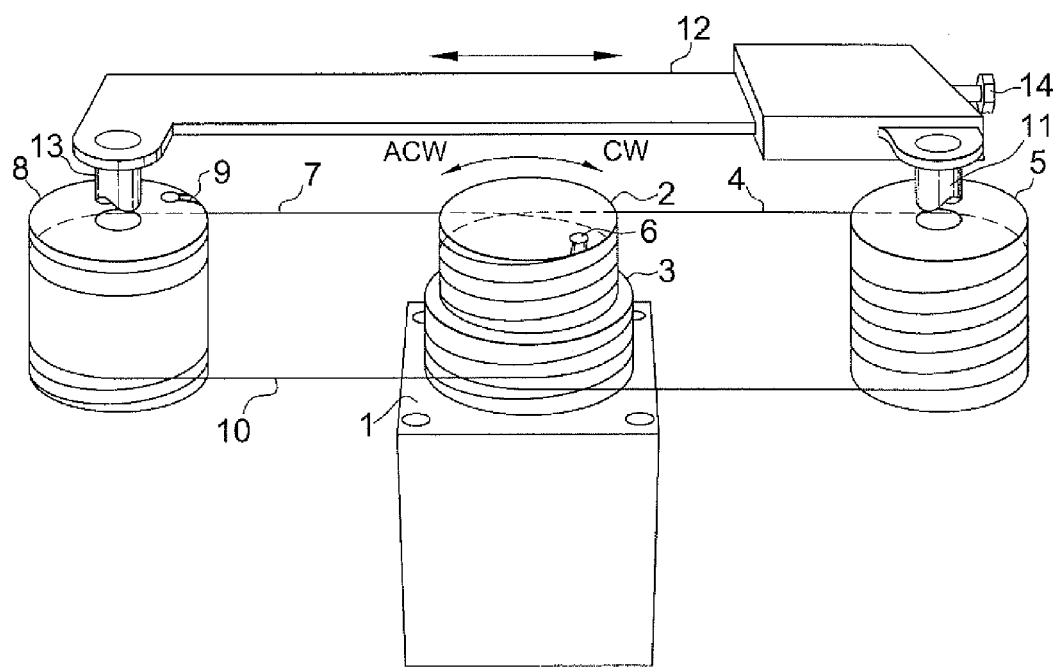

This application is the U.S. national stage application of, and claims priority from, International Application No. PCT/EP2007/051289, filed Feb. 9, 2007, which in turn claims priority from United Kingdom patent application No. 0603055.5 filed with the UK Patent Office on Feb. 15, 2006, both of which are incorporated herein by reference in their entirety. The International Application was published in English on Aug. 23, 2007 as WO 2007/093564.

The present invention is concerned with rotary to linear transmission and is particularly, but not exclusively, concerned with transmissions for use in confined and high load environments, such as an aircraft flight simulator.

An aircraft simulator system usually consists of a cabin containing simulated aircraft controls for use by a user of the simulator. As far as possible, the purpose of the simulator is to mimic the behaviour of an aircraft from the perspective of the user experience. To that end, mechanical controls such as a joystick, levers or pedals, are provided in the cabin for pilot actuation. These are provided with hydraulic actuation to provide mechanical feedback simulating feedback forces which would be experienced by a pilot in a real flying situation. The actuation comprises dynamic loading to simulate the flying controls experienced by a pilot in all conditions both on the ground and in flight. The user experience, such as the 'feel' of the controls, will vary with atmospheric conditions, aircraft speed and any manoeuvres undertaken by the aircraft being simulated. In addition, the simulated controls must reproduce fault conditions and failures. The accuracy and power to meet all of these demands has conventionally required sophisticated, servo controlled hydrostatic actuators.

For effective servo loop control, it is essential that an actuator display smooth operation with very low static and coulomb friction, and zero backlash.

However, many hydraulic actuators will be required in order to provide a realistic simulation. Having so many hydraulic actuators can be problematic, because hydraulic actuators require substantial maintenance. This is because hydraulic actuators, subject to use and wear, will eventually result in leakage of hydraulic fluid. Hydraulic fluid will therefore, from time to time, require replacement, and further, seals within hydraulic actuators will require replacement. Moreover, in practical simulator designs, actuators for loading control components will often be located in confined spaces, and access thereto may be from beneath—leaks of hydraulic fluid in such cases can be particularly frustrating for a maintenance technician. Drip shields may need to be provided to avoid contact of fluid with electrical components or conductors local to the actuators.

Therefore, it has become desirable to employ the use of electrical actuators in place of hydraulic actuators. In many cases, there has been a desire to update existing flight simulators by replacement of hydraulic actuators with electrical actuators. Moreover, there is a desire to avoid excessive redesign of a flight simulation device to accommodate new linkages and transmissions. Hydraulic actuators are advantageous in that they can be accommodated within relatively elongate spaces, and require little access space; the provision of hydraulic fluid under pressure can be by means of tubing which is inherently flexible and can thus be accommodated without significant displacement of neighbouring equipment.

Thus, there is a need to provide electrical actuators which can be accommodated in the relatively small spaces within which hydraulic actuators may have been fitted.

Electrical actuators would generally comprise an electrical drive motor and a mechanical coupling to convert rotation output from the motor into linear displacement. Two ways of achieving this have been implemented, namely a gear train (desirably of close tolerance to minimise backlash) or a capstan and sector based cable drive arrangement.

In each case, only arcuate force output is achievable, and therefore conversion to linear output will require software modification and/or upgrade in order to achieve compensation for the difference in dynamic transfer function between the input power request and output motive force, between the original hydraulic based linkage and the replacement electromechanical part. Alternatively, an additional transmission stage can be provided which will convert the motion into true linear motion, but this can be bulky.

Further, while a capstan and sector approach can be used to achieve a reduction in rotation, by using a small capstan and large sector, such an arrangement may not be compact, and can be difficult, or impossible, to fit into existing control loading frames designed for hydraulic actuators. Further, reduction ratios are limited by the need for a very large sector for even small ratio drives, which means that large motors must be fitted and/or the forces achieved are lower than achievable by means of the previously employed hydraulic actuators.

Moreover, the minimum pulley diameter (for reasonable cable fatigue life) is generally around 20 times the cable diameter, when using very flexible aircraft cable (e.g. 7×19 construction). Combined with this, for practical purposes, space constraints limit the reduction ratio to around 7:1 whereas, for maximum power density and the optimum combination of force and dynamic response, the most desirable reduction ratio range is between 10:1 and 20:1. Further, a reduction ratio such as this will require the sector to have a radius of between 100 and 200 times the cable diameter, if reasonable cable life is to be maintained. Therefore, it can be seen that accommodating capstan and sector pulley arrangements in practical designs can be very difficult.

It is therefore desirable to provide a rotation to linear transmission capable of being accommodated in a relatively small space, and which provides substantially linear relationship between force and displacement. It is therefore desirable to incorporate speed reduction and rotary to linear conversion in a single stage. Providing a stiff structure and one which reduces the effect of backlash is further desirable.

According to one aspect of the invention, a rotary to linear transmission comprises:
  first and second drive capstans rotatable in unison about a common axis, said first capstan having smaller diameter than said second capstan;
  first and second idler pulley means rotatable about axes parallel to said capstan axis, the capstans being interposed between the idler pulleys;
  a linkage member supporting said first and second idler pulleys for rotation on their axes and retaining said axes at a fixed relative distance;
  first pulley line means windingly engaged about the first capstan, the first idler pulley, and the second capstan;
  second pulley line means windingly engaged about the first capstan and the second idler pulley means in the same sense as the first pulley line means;
  third pulley line means windingly engaged about the second capstan and the second idler pulley means in the same sense as the first and second pulley line means.

Engagement of the capstans and the idler pulley means, by means of the first, second and third pulley line means, provides a linkage in which rotational drive to the capstans in unison will cause differential winding of the pulley line means and thereby urge the first idler pulley towards the capstans in one winding direction, and therefore the second idler pulley correspondingly away. Tension is maintained by the provision of the first, second and third pulley line means.

In a preferred embodiment, the first and second idler pulley means are substantially cylindrical pulley wheels. The pulley wheels may comprise pulley line engagement means. The capstans may further be provided with pulley line engagement means. The pulley line engagement means may comprise helical tracks.

The pulley line means may be cables. The cables may be of metal wire construction.

A drive motor may be provided, engaged with the capstans for rotational drive thereof. The drive motor may be electrical. The drive motor may be engaged directly with the capstans.

A second aspect of the invention provides a mechanical linkage, for use on original equipment or for replacement of existing hydraulic ram based actuators, comprising a rotary to linear transmission. The transmission provides two co-rotatable capstans of different diameters, and two idler wheels spaced on a longitudinally slidable linkage. The capstans are linked to a first of the idler wheels by means of a pulley line wound from the first capstan, around the wheel, and then back to the second capstan. The first capstan is also linked by means of a pulley line to the second idler wheel, and the second capstan likewise to the second idler wheel by a third pulley line. The difference in diameters causes a differential winding of the various lengths of pulley line between the idler wheels and the capstans, which urges the linkage to slide relative to the capstans. Cooperation of the two capstan/idler wheel combinations compensates for possible backlash.

A specific embodiment of the invention will now be described with reference to the accompanying drawing. It will be appreciated that the example shown in the drawing is of one of many arrangements which fall within the scope of the present invention and no restriction or limitation upon the scope of the claims should be read from the specific terms used in the following.

FIG. 1 is a perspective view of an actuator in accordance with a specific embodiment of the invention.

As shown in FIG. 1, a drive motor 1 has an output drive axle imparting rotary drive to first and second drive capstans 2, 3 mounted thereon. The first capstan 2 is of smaller diameter than the second 3. The drive capstans 2, 3 are mounted coaxially and adjacent each other.

The drive capstans have been illustrated as being of a cylindrical shape; however, it will be appreciated that there may be advantage in providing a helical track on each for accommodation of a pulley wire, as will be described in due course.

Spaced either side of the drive capstans are first and second idler pulleys 5, 8. The idler pulleys have parallel axes of rotation, which are also parallel to the drive axis of the motor. Again, while the idler pulleys are illustrated for reasons of simplicity as being cylindrical, any suitable shape could be provided, and particularly a helical track could be provide on each for accommodation of a pulley wire.

The rotational axes of the idler pulleys 5, 8 and the capstans 2, 3 are coplanar. In an alternative embodiment, these rotational axes could be out of plane.

The first idler pulley 5 is rotatable around a first idler pulley axle 11. Similarly, the second idler pulley is rotatable about a second idler pulley axle 13. Each of these is attached to either end of a longitudinal carriage member 12. The carriage member 12 comprises a tensioning adjuster which is engaged by a tensioning adjuster pin 14 as illustrated. Rotation of the tensioning adjuster pin 14 will cause longitudinal extension or compression of the carriage member 12, with consequent adjustment to the tension of pulley wires as will be appreciated from the following description.

The motor 1 is mounted on a base plate (not shown) to which is also attached a linear bearing (not shown) in which the carriage member is longitudinally slidingly engaged.

In order to engage the drive capstans 2, 3 with the first idler pulley 5, a first end of a first pulley cable 4 is fixed to the first drive capstan 2, and wound an initial number of rotations around the first capstan to allow for the pulley cable 4 to pay off as the first drive capstan 2 rotates in a clockwise direction (marked by the arrow CW in FIG. 1), then extends to the first idler pulley 5 and wound there around in the same sense. Then, the pulley cable 4 returns to the larger, second drive capstan 3, and is further wound therearound in the same sense again. The end of the pulley cable 4 distal the first end is then affixed to the second drive capstan 3.

The pulley cable 4 is provided as a substantially inextensible wire cable. It will be understood that some extension will be accommodated by pre-tensioning but, during pulley operation in the actuator, it is expected that further significant extension will not be experienced. It will further be appreciated that other materials could also be suitable for use, in the event that environmental or other conditions render wire cable inappropriate.

In that way, as illustrated, clockwise rotation of the drive capstans 2, 3 in unison will cause the pulley wire to be paid off the smaller drive capstan 2, and wound onto the second drive capstan 3, while rotationally engaging with the first idler pulley 5.

A first end of a second pulley cable 7, also of wire cable construction, is fixed to the first drive capstan 2, and is wound an initial number of rotations around the first capstan 2 to allow for the pulley cable 7 to wind thereon on as the first drive capstan 2 rotates in a clockwise direction. It then extends to the second idler pulley 8 and wound therearound in the same sense. The end of the pulley cable 7 distal the first end is then affixed to the second idler pulley 8.

A first end of a third pulley cable 10, also of wire cable construction, is fixed to the second drive capstan 3, and is wound an initial number of rotations around the second capstan to allow for the third pulley cable 10 to pay off the second drive capstan 3 as the same rotates in a clockwise direction. It then extends to the second idler pulley 8 and is wound therearound in the same sense. The end of the pulley cable 10 distal the first end is then affixed to the second idler pulley 8.

As the capstans rotate clockwise in unison, the first cable 4 will wind onto the second capstan 3, and the second cable 7 will wind onto the first capstan 2. Since the idler pulleys 5, 8 cannot move linearly relative to each other, they will be urged into rotation. The first cable 4 will also be paid off the first capstan 2 and the third cable will be paid off the second capstan. This will result in winding of all three pulley cables 4, 7, 10.

The different diameters of the capstans 2, 3 means that, when the capstans 2, 3 are so rotated, relatively less of the first cable 4 will be paid off the first drive capstan 2 than wound on to the second drive capstan 3. Similarly relatively less of the second cable 7 will be wound onto the first capstan 2, than the third cable will be paid off the second capstan 3. Therefore, as the pulley wire is substantially inextensible, the first idler pulley axle 11 is caused to be drawn closer to the axis of rotation of the capstans 2, 3. Because the second and third cables 7, 10 provide a complementary pulley mechanism to the first 4, any pre-tension provided by the tensioning adjuster 14 will be maintained.

The cables are all pre-tensioned against each other, thereby greatly reducing the impact of backlash. In practical embodiments, backlash can effectively be eliminated, within the context of the implementation concerned. Further, as the pre-tensioning is mutual, there is no static net force to change carriage position, or to pre-load input shaft bearings. Only the carriage structure is under permanent compression load, due to the cable pre-tension, and is constructed to withstand this.

It will be understood that the arrangement as illustrated can be encapsulated into an encasement allowing movement of the carriage 12 relative to the motor 1 and capstans 2, 3. The encasement can thus be mounted on the base plate referred to above. A framework supporting the idler pulleys may also be provided in order to avoid jamming or interference.

Linear drive output can be extracted from the illustrated actuator by mounting points on the base plate and the linkage member 12. In that way, replication of the dynamics of a hydraulic actuator is possible.

The actuator thus provides a linear conversion between the rotational motion input by the motor and the longitudinal output provided by the linkage. Software upgrade is thus unlikely to be required.

An aspect of the invention, or specific embodiments thereof, therefore provides an arrangement comprising two opposed differential cable reduction systems, the opposition being used to eliminate (or substantially eliminate) the effect of backlash, and to deliver rotational to linear conversion of force and motion.

An advantage of embodiments of the invention is that implementations can be used to deliver a wide range of reduction ratios, given practical limits determined by materials selection (or other factors). In particular, the most desirable range of 8:1 to 20:1 can be delivered without the need to provide very widely differing capstan radii (which could limit compactness).

Another advantage of such embodiments is that the arrangement is reversible, capable of delivering force output of the same magnitude in both directions.

The described embodiments demonstrate aspects of the invention which provide a single transmission stage for both motor speed reduction and rotary to true linear output.

It will be understood that the foregoing provides an illustrative example of the invention, and should not be treated as imparting limitation on the implementation of the invention. Rather, the scope of protection should be determined by the claims appended hereto, which are to be read in conjunction with, but not limited by, the description and accompanying drawing.

The invention claimed is:

1. A rotary to linear transmission comprising:
   a body member
   first and second drive capstans rotatable in unison about a common axis relative to said body member, said first capstan having smaller diameter than said second capstan;
   first and second idler pulley means rotatable about axes parallel to said capstan axis, the capstans being interposed between the first and second idler pulley means;
   a linkage member supporting said first and second idler pulleys for rotation on their axes and retaining said axes at a particular relative distance, said linkage member being engaged relative to said body member for non-arcuate and substantially linear motion;
   first pulley line means windingly engaged about the first capstan, the first idler pulley, and the second capstan;
   second pulley line means windingly engaged about the first capstan and the second idler pulley means in the same direction as the first pulley line means; and
   third pulley line means windingly engaged about the second capstan and the second idler pulley means in the same direction as the first and second pulley line means;
   such that rotation of said capstans in unison is operable to cause differential winding of said first, second and third pulley line means in cooperation and thereby urging of said idler pulleys and said linkage member in said substantially linear engagement of said linkage member relative to said capstans.

2. A transmission in accordance with claim 1 and wherein the first, second and third pulley line means are pre-tensioned.

3. A transmission in accordance with claim 2 and further comprising a tensioning adjuster for adjusting the pre-tensioning of the first, second and third pulley line means.

4. A transmission in accordance with claim 3 wherein the tensioning adjuster comprises a tensioning adjuster pin operable to adjust the relative distance between the axes of rotation of the idler pulley means.

5. A transmission in accordance with claim 1 wherein the first and second idler pulley means are substantially cylindrical pulley wheels.

6. A transmission in accordance with claim 5 wherein the pulley wheels comprise pulley line engagement means.

7. A transmission in accordance with claim 1 wherein the capstans are provided with pulley line engagement means.

8. A transmission in accordance with claim 7 wherein the pulley line engagement means comprises helical tracks.

9. A transmission in accordance with claim 1 wherein at least one of the first, second and third pulley line means comprise cables.

10. A transmission in accordance with claim 9 wherein the cables are of metal wire construction.

11. A transmission in accordance with claim 1 and further comprising a drive motor engaged with the capstans for rotational drive thereof.

12. A transmission in accordance with claim 11 wherein the drive motor is electrical.

13. A transmission in accordance with claim 12 wherein the drive motor is engaged to drive the capstans directly.

* * * * *